US012525260B2

United States Patent
Lee et al.

(10) Patent No.: US 12,525,260 B2
(45) Date of Patent: Jan. 13, 2026

(54) WORDLINE SIDEWALL CONTACTS IN 3D NAND STRUCTURES

(71) Applicant: Applied Materials, Inc., Santa Clara, CA (US)

(72) Inventors: Hsiang Yu Lee, Cupertino, CA (US); Pradeep K. Subrahmanyan, Los Gatos, CA (US); Takaya Matsushita, Tokyo (JP); Changwoo Sun, Ontario (CA)

(73) Assignee: Applied Materials, Inc., Santa Clara, CA (US)

( * ) Notice: Subject to any disclaimer, the term of this patent is extended or adjusted under 35 U.S.C. 154(b) by 109 days.

(21) Appl. No.: 18/366,903

(22) Filed: Aug. 8, 2023

(65) Prior Publication Data
US 2024/0046966 A1    Feb. 8, 2024

Related U.S. Application Data

(60) Provisional application No. 63/396,214, filed on Aug. 8, 2022.

(51) Int. Cl.
*G11C 5/06*     (2006.01)
*H10B 43/20*    (2023.01)
*H10B 43/35*    (2023.01)

(52) U.S. Cl.
CPC ............ *G11C 5/063* (2013.01); *H10B 43/20* (2023.02); *H10B 43/35* (2023.02)

(58) Field of Classification Search
CPC ........ G11C 5/063; H10B 43/20; H10B 43/35; H10B 41/50; H10B 43/50; H10B 41/27; H10B 43/27

USPC ............................................... 365/63, 185.24
See application file for complete search history.

(56) References Cited

U.S. PATENT DOCUMENTS

| | | | |
|---|---|---|---|
| 10,636,812 B1 * | 4/2020 | Lai | G11C 11/5628 |
| 11,037,631 B2 * | 6/2021 | Pachamuthu | G11C 16/3445 |
| 2012/0306090 A1 | 12/2012 | Smith et al. | |
| 2015/0263012 A1 * | 9/2015 | Murakoshi | H10D 30/6893 257/317 |

(Continued)

FOREIGN PATENT DOCUMENTS

| | | |
|---|---|---|
| CN | 108766971 A | 11/2018 |
| KR | 20140000719 A | 1/2014 |
| TW | I787089 B * | 12/2022 |

OTHER PUBLICATIONS

Application No. PCT/US2023/071831, International Search Report and the Written Opinion, Mailed On Nov. 28, 2023, 11 pages.

*Primary Examiner* — Michael T Tran
(74) *Attorney, Agent, or Firm* — Kilpatrick Townsend & Stockton LLP

(57) ABSTRACT

A three-dimensional (3D) NAND memory structure may include material layers arranged in a vertical stack including alternating horizontal insulating layers and wordline layers. The material layers may be etched to form a landing pad. A vertical wordline may extend through one or more of the horizontal wordline layers beneath the landing pad. The vertical wordline may be conductively connected to a top horizontal wordline, and the vertical wordline may be insulated from any of the horizontal wordlines that the vertical wordline extends through beneath the top horizontal wordline. A liner may also be formed over a top horizontal wordline at the landing pad.

19 Claims, 10 Drawing Sheets

(56) References Cited

U.S. PATENT DOCUMENTS

| | | |
|---|---|---|
| 2017/0117291 A1* | 4/2017 | Or-Bach ................ H10D 30/63 |
| 2018/0102177 A1* | 4/2018 | Wu .................... G11C 16/3413 |
| 2019/0148286 A1* | 5/2019 | Or-Bach ................ H10B 43/20 |
| | | 257/315 |
| 2019/0148506 A1 | 5/2019 | Kanakamedala et al. |
| 2019/0252396 A1 | 8/2019 | Mushiga et al. |
| 2019/0287618 A1* | 9/2019 | Kimura .................... G11C 7/04 |
| 2020/0365213 A1* | 11/2020 | Jeon ....................... G11C 16/32 |
| 2020/0388336 A1* | 12/2020 | Yun ........................ G11C 16/08 |
| 2021/0090663 A1* | 3/2021 | Son ......................... G11C 8/14 |
| 2021/0125928 A1* | 4/2021 | Kim ....................... H10B 43/50 |
| 2021/0143100 A1 | 5/2021 | Chakravarthi et al. |
| 2021/0233592 A1* | 7/2021 | Nardi ..................... G11C 16/26 |
| 2021/0257039 A1* | 8/2021 | Prakash ............. G11C 16/3427 |
| 2022/0139831 A1 | 5/2022 | Kim et al. |
| 2023/0350606 A1* | 11/2023 | Hsu ....................... G06F 3/0679 |
| 2023/0386531 A1* | 11/2023 | Tang ........................ G11C 7/22 |

* cited by examiner

WORDLINE SIDEWALL CONTACTS IN 3D NAND STRUCTURES

CROSS-REFERENCES TO RELATED APPLICATIONS

This application claims the benefit of U.S. Provisional Application No. 63/396,214 filed on Aug. 8, 2022, which is incorporated herein by reference.

TECHNICAL FIELD

This disclosure generally describes methods and structures for 3D NAND flash memory devices. More specifically, this disclosure describes techniques for fabricating wordlines in 3D NAND memory structures.

BACKGROUND

A memory design known as NAND memory is a non-volatile flash memory storage architecture that does not require power to maintain its stored data. NAND flash memory is used in many products, such as solid-state devices and portable electronics. In order to improve the density and reduce the size of NAND memories, traditional two-dimensional (2D) NAND architectures have transitioned to three-dimensional (3D) NAND stacks. Unlike 2D planar NAND technologies where the individual memory cells are stacked together on separate horizontal substrates, 3D NAND is stacked vertically using multiple layers of alternating conducting and dielectric materials with intersecting vertical channels.

BRIEF SUMMARY

In some embodiments, a 3D NAND memory structure may include a plurality of material layers arranged in a vertical stack that may include alternating horizontal insulating layers and horizontal wordline layers. The plurality of material layers may be etched to form a landing pad. The structure may also include a vertical wordline that may extend through one or more of the horizontal wordline layers beneath the landing pad. The vertical wordline may be conductively connected to a top horizontal wordline in the plurality of alternating material layers, and the vertical wordline may be insulated from the one or more horizontal wordlines that the vertical wordline extends through beneath the top horizontal wordline.

In some embodiments, a method of fabricating 3D NAND memory structures may include forming a plurality of material layers arranged in a vertical stack that may include alternating horizontal insulating layers and horizontal wordline layers. The plurality of material layers may be etched to form a landing pad. The method may also include etching a hole for a vertical wordline that extends through one or more of the horizontal wordline layers beneath the landing pad.

In some embodiments, a 3D NAND memory structure may include a plurality of material layers arranged in a vertical stack that may include alternating horizontal insulating layers and horizontal wordline layers. The plurality of material layers may be etched to form a landing pad. The structure may include a liner formed over a top horizontal wordline at the landing pad. The liner may define a gap between the liner and a vertical sidewall adjacent to the landing pad.

In any embodiments, any and/or all of the following features may be implemented in any combination and without limitation. The structure may also include oxide barrier layers that insulate the one or more horizontal wordlines from the vertical wordline. The barrier layer may be disposed between the vertical wordline and the top horizontal wordline at the landing pad. The structure may also include a conductive liner over the top horizontal wordline at the landing pad that conductively contacts the top horizontal wordline and the vertical wordline. The vertical wordline may extend down to a substrate beneath the plurality of material layers. The vertical wordline may extend down into a substrate beneath the plurality of material layers. The vertical wordline may contact the horizontal insulating layers. The method may also include filling the hole for the vertical wordline with a fill material, and exhuming a sacrificial material from the horizontal wordline layers. The method may also include forming a barrier layer in voids left after exhuming the sacrificial material from the horizontal wordlines, where the barrier layer may be formed on a vertical sidewall of the fill material that is exposed in the voids left after exhuming the sacrificial material. Forming the barrier layer may include forming an oxide layer on the vertical sidewall of the fill material using an ALD process. The barrier layer may be between 100 Å and 150 Å thick. The method may also include filling the voids left after exhuming the sacrificial material from the horizontal wordlines with a first conductive material; removing the fill material from the hole for the vertical wordline; and/or filling the hole for the vertical wordline with a second conductive material, where the barrier layer may insulate the second conductive material from the first conductive material for the one or more horizontal wordlines beneath the landing pad. The liner may include an insulating liner formed of a material that is different from a sacrificial material that forms the horizontal wordline layers. The liner may include a conductive liner comprising a first conductive material that is in conductive contact with a second conductive material that forms the top horizontal wordline at the landing pad. The structure may also include a barrier layer between the horizontal wordline layers and a vertical wordline that insulates the horizontal wordline layers from the vertical wordline. The liner may expose a vertical sidewall of the plurality of material layers adjacent to the landing pad. The gap may be between about 50 nm and about 100 nm wide. The gap may expose a portion of the top horizontal wordline at the landing pad.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
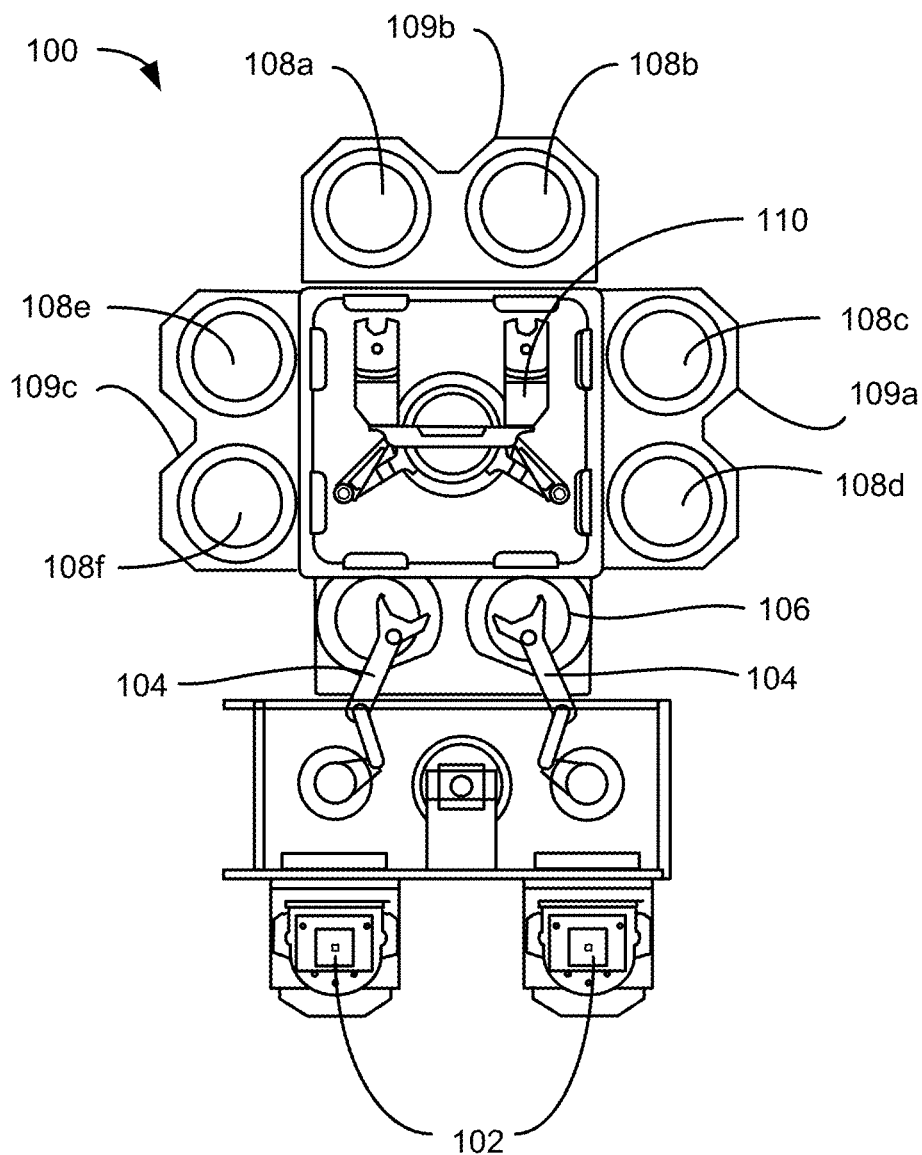
FIG. 1 illustrates a top plan view of one embodiment of a processing system of deposition, etching, baking, and curing chambers according to some embodiments.

FIG. 1 illustrates a top plan view of one embodiment of a processing system 100 of deposition, etching, baking, and curing chambers according to some embodiments. In the figure, a pair of front opening unified pods 102 supply substrates of a variety of sizes that are received by robotic arms 104 and placed into a low pressure holding area 106 before being placed into one of the substrate processing chambers 108a-f, positioned in tandem sections 109a-c. A second robotic arm 110 may be used to transport the substrate wafers from the holding area 106 to the substrate processing chambers 108a-f and back. Each substrate processing chamber 108a-f, can be outfitted to perform a number of substrate processing operations including the dry etch processes described herein in addition to cyclical layer deposition, atomic layer deposition, chemical vapor deposition, physical vapor deposition, etch, pre-clean, anneal, plasma processing, degas, orientation, and other substrate processes.

The substrate processing chambers 108a-f may include one or more system components for depositing, annealing, curing and/or etching a material film on the substrate or wafer. In one configuration, two pairs of the processing chambers, for example 108c-d and 108e-f, may be used to deposit material on the substrate, and the third pair of processing chambers, for example 108a-b, may be used to cure, anneal, or treat the deposited films. In another configuration, all three pairs of chambers, for example 108a-f, may be configured to both deposit and cure a film on the substrate. Any one or more of the processes described may be carried out in additional chambers separated from the fabrication system shown in different embodiments. It will be appreciated that additional configurations of deposition, etching, annealing, and curing chambers for material films are contemplated by the processing system 100. Additionally, any number of other processing systems may be utilized with the present technology, which may incorporate chambers for performing any of the specific operations. In some embodiments, chamber systems which may provide access to multiple processing chambers while maintaining a vacuum environment in various sections, such as the noted holding and transfer areas, may allow operations to be performed in multiple chambers while maintaining a particular vacuum environment between discrete processes.

The processing system 100, or more specifically chambers incorporated into the processing system 100 or other processing systems, may be used to produce structures according to some embodiments of the present technology. For example, the processing system 100 may be used to produce memory arrays by performing operations such as deposition, etch, sputtering, polishing, cleaning, and so forth, in the various substrate processing chambers 108.

A 3D NAND memory structure may include a plurality of alternating metal-and-oxide layer pairs that are stacked vertically on top of each other. Each of the horizontal metal layers may represent a wordline that is associated with a vertical channel to form a memory element. In order to connect these horizontal wordlines, a landing pad may be created at each individual metal-and-oxide layer pair for connection to a vertical wordline.

Figure 2B:
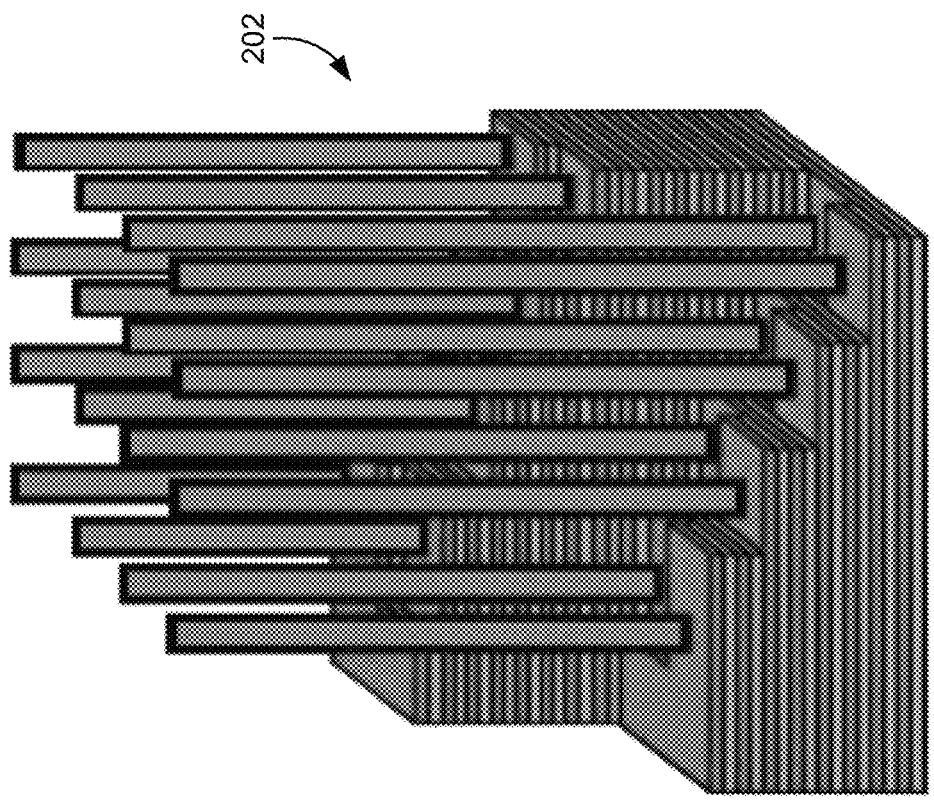
FIGS. 2A-2B illustrate 3D NAND structures formed to expose landing pads for the horizontal wordlines, according to some embodiments.
Figure 2A:
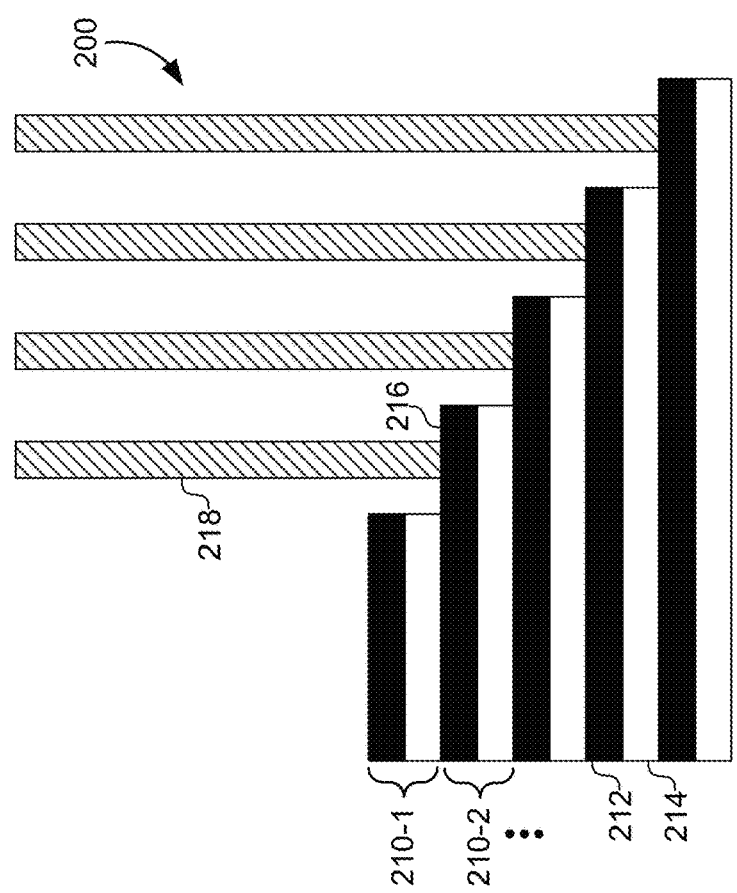

FIG. 2A illustrates a 3D NAND structure 200 formed using a staircase etch to expose landing pads 216 for each of the horizontal wordlines, according to some embodiments. This staircase formation for the 3D NAND structure 200 may be formed by forming a lithographic photoresist mask on top of the structure and then repeatedly removing an edge portion of the mask and performing a directional etch downward to remove individual layer pairs 210. Each of the layer pairs 210 may include a metal layer 212 and oxide layer 214. As described below, each of the metal layers 212 may be formed by filling voids left after removing a sacrificial nitride material. The landing pads 216 may expose individual metal layers 212 in each of the layer pairs 210. The vertical wordlines 218 may then be formed such that the individual vertical wordlines 218 contact only the corresponding horizontal wordline. Care is normally taken to avoid etching through the metal layers 212 in order to prevent the vertical wordlines 218 from contacting more than one of the metal layers 212.

FIG. 2B illustrates an alternate 3D NAND structure 202, according to some embodiments. Instead of forming the pure staircase structure as illustrated in FIG. 2A, other embodiments may use different geometries to expose landing pads for each of the vertical wordlines. This particular type of structure 202 may be formed using what is referred to as a chop etch. It should be understood that any geometry or 3D NAND structure may be used in conjunction with the techniques described below and/or the disclosed methods for forming a contact between the horizontal metal layers and the vertical wordlines. Therefore, as used herein, a landing pad or contact pad may be defined as a surface etched into the 3D NAND structure as part of a staircase or chop etch that forms a surface to contact a vertical wordline.

It should also be understood that these 3D NAND structures 200, 202 may be very large in practice, including hundreds of alternating oxide/nitride layers. The metal layers 212 may be formed from any conductive or metal material, and the vertical wordlines 218 may also be formed from any conductive or metal material, including tungsten, molybdenum, or other similar materials. These figures are not drawn to scale, and the vertical wordlines 218 may be much wider than the thickness of the metal layers 212 and/or the oxide layers 214. For example, the exposed surface of the landing pad 216 may be between about 600 nm and about 900 nm, and the width of the vertical wordlines 218 may between about 100 nm and about 300 nm, such as about 200 nm.

Each of the vertical wordlines 218 may be formed together in a single etch process. Therefore, the etch process may typically have a very high selectivity relative to the tungsten of the metal layers 212 of the landing pad 216 in order to avoid etching through the metal layers 212 when forming the vertical holes for the vertical wordlines 218. Therefore, a technical problem exists in fabricating 3D NAND structures in that great precision is required when etching the holes for the vertical wordlines 218. Because the etch must be very selective to the material of the metal layers 212, this limits the types of etches that may be used and creates a risk of punching through the metal layers 212 unintentionally, thereby connecting multiple metal layers 212 in the structure.

The embodiments described herein solve these and other technical problems by forming a horizontal contact layer on the landing pad and vertically isolating the vertical wordlines from the underlying metal layers in the stack. Instead of carefully etching down to the contact pad, holes may be etched through the contact pad and through the underlying oxide/metal layer pairs. These holes may then be filled with silicon and subjected to an oxidation process after the sacrificial nitride layers are removed. Next, when filling the voids left from the sacrificial nitride layers with the metal layers, the silicon oxide layers may isolate the horizontal metal wordline layers from the vertical holes formed for the vertical metal wordlines. A metal layer may fill the layer voids from each landing pad to contact the vertical wordlines at the top layer, while the underlying layers are isolated by the silicon oxide isolation layers.

Figure 3:
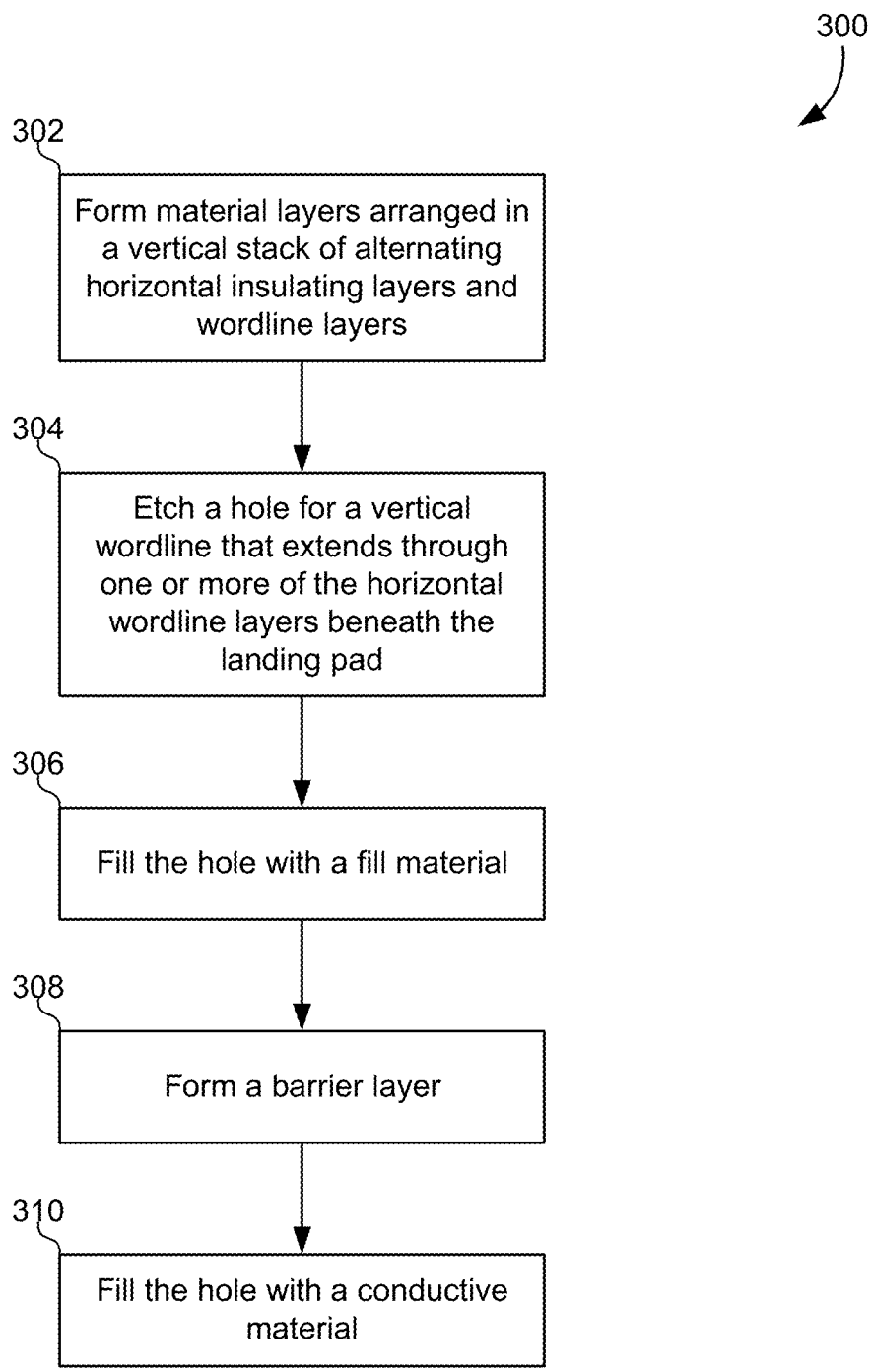
FIG. 3 illustrates a method of fabricating 3D NAND memory structures, according to some embodiments.

FIG. 3 illustrates a method 300 of fabricating 3D NAND memory structures, according to some embodiments. FIGS. 4A-4L illustrate incremental structural steps in the process for forming a 3D NAND structure. The structural illustrations are provided only by way of example and not meant to be limiting. Each of the method steps may be broader than the specific examples illustrated in FIGS. 4A-4L.

Figure 4A:
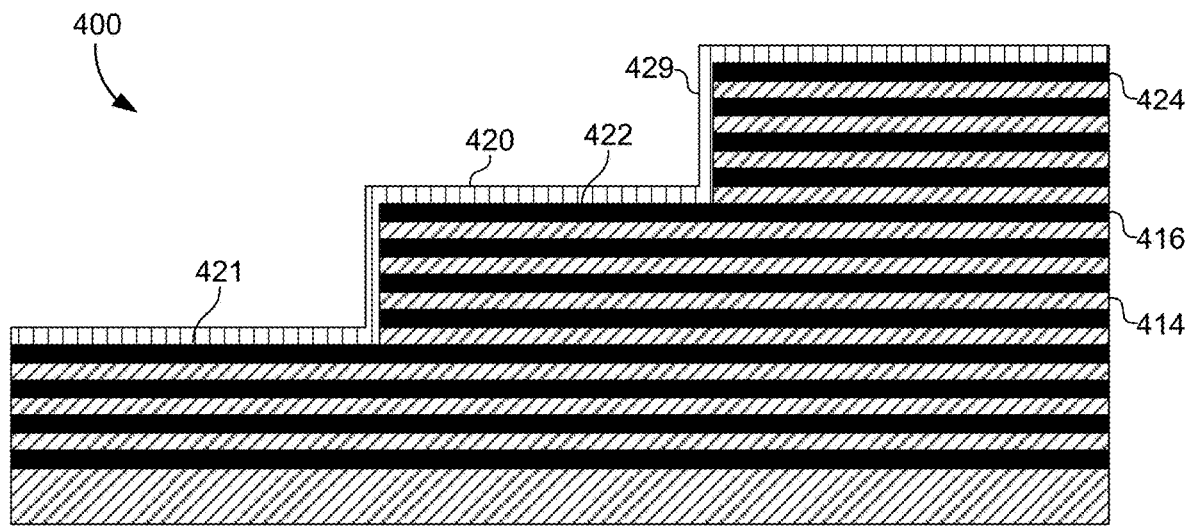
FIGS. 4A-4L illustrate a steps in a process for forming a 3D NAND structure, according to some embodiments.

The method 300 may include forming a plurality of material layers arranged in a vertical stack comprising alternating horizontal insulating layers and horizontal wordline layers (302). FIG. 4A illustrates a 3D NAND structure 400 after performing a staircase etch or other operation to expose a plurality of landing pads, according to some embodiments. The 3D NAND structure 400 may be formed on a substrate, and may have a plurality of stacked layers overlying the substrate. The substrate may include silicon, silicon germanium, or other substrate materials. The layers may include IPD layers of ONO layers, including a dielectric material, which may be silicon oxide, in alternating layers. For example, the structure 400 may include a plurality of alternating layers of a horizontal insulating layer 414, such as oxide or silicon oxide layers. The structure 400 may also include layers of a placeholder or sacrificial material, which may be silicon nitride or polysilicon and which may be referred to as a horizontal sacrificial layers 416. The sacrificial layers 416 may be or include material that will be removed to produce individual memory cells in subsequent operations. Therefore, the sacrificial layers 414 may also be referred to as horizontal wordline layers since these layers will later be used as wordlines. As used herein, the term wordline may refer to these layers filled with either a sacrificial material or with a conductive or metal material.

Although illustrated with only a limited number of layers of material, exemplary structures may include any of the numbers of layers including hundreds of layers of material, and it is to be understood that the figures are only schematics to illustrate aspects of the present technology. For example, the semiconductor structure 400 may include 10 or more layer pairs, more layer pairs, 50 or more layer pairs, 100 or more layer pairs, and so forth. For example, a height of the structure 400 may be more than 10 μm, more than 20 μm, and so forth.

In this example, an etch has been used to expose a contact pad or landing pad 422 for the wordlines. The landing pad 422 may expose the sacrificial layer 416 at each alternating oxide/nitride layers. The landing pad 422 may be defined as the flat area of the sacrificial layer that is exposed between the be different etch levels in the structure 400. For example, FIG. 4A shows three different landing pads 421, 422, 423. The etch that produces the landing pads 421, 422, 423 may include a staircase etch as illustrated in FIG. 2A and/or a chop etch as illustrated in FIG. 2B. The following discussion will focus on landing pad 422, but is equally applicable to other etch types.

After exposing the landing pad 422, a liner 420 may be deposited over the structure 400. The liner 420 may include a doped silicon oxide layer. For example, the silicon oxide of the liner 420 may be doped with boron, phosphorus, both boron and phosphorus, or other similar materials. The liner 420 may be deposited using any deposition technique. For example, the liner 420 may be deposited using an Atomic Layer Deposition (ALD) process such that the liner 420 is formed over the sacrificial layer 416 exposed at the top of the landing pad 422. The liner 420 may also be formed vertically against the exposed alternating layers of the sacrificial layers 416 and the insulating layers 414. Other techniques for deposition may include Chemical Vapor Deposition (CVD) and other similar processes.

Figure 4B:
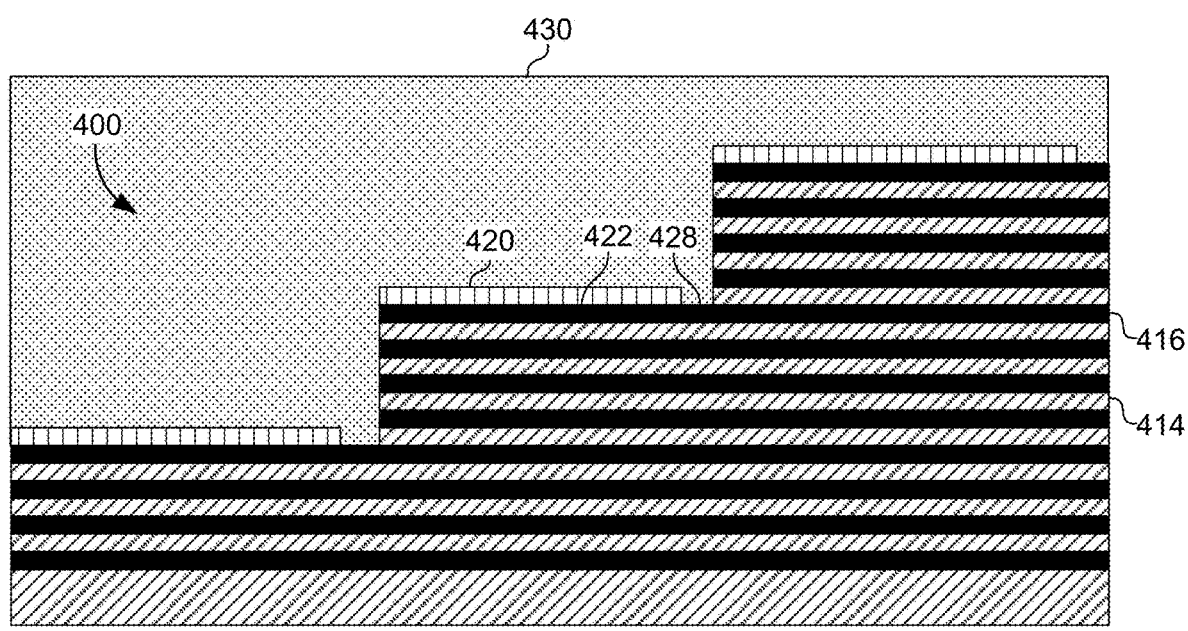

FIG. 4B illustrates the removal of a portion of the liner, according to some embodiments. For example, the sidewall 429 of the liner 420 may be removed from the exposed edges of the alternating insulating layers 414 and sacrificial layers 416. This sidewall 429 of the liner 420 may be removed using a dry etch process, such as a directional etch. For example, a carbon layer may be deposited on top of the liner 420 to expose the sidewall 429 to an argon treatment such that only the surface area of the sidewall 429 is exposed to the argon treatment, and the vertical sidewall 429 may then be removed.

Removing the sidewall 429 may define a gap 428 where the sacrificial layer 416 is exposed. For example, the gap 428 may be defined by an edge of the liner 420 and a vertical sidewall of the plurality of material layers adjacent to the landing pad as illustrated in FIG. 4B. The gap 428 may be about 50 nm to about 100 nm wide. In various implementations, the gap 428 may be less than or about 25 nm, less than or about 50 nm, less than or about 75 nm, less than or about 100 nm, less than or about 125 nm, less than or about 150 nm, and so forth. The gap 428 may be sized based on a thickness of the vertical sidewall 429 that is exposed by the carbon layer when removing the vertical sidewall 429. In comparison, the length of the landing pad 422 may be about 600 nm to about 1000 nm wide. After removing the sidewall 429 of the liner 420 and exposing the gap 428 on the landing pad 422, a large-area gap fill using a gap fill material 430 may be performed. For example, a silicon oxide may serve as the gap fill material 430 in the area above the landing pads 421, 422, 423 of the staircase structure 400.

Figure 4C:
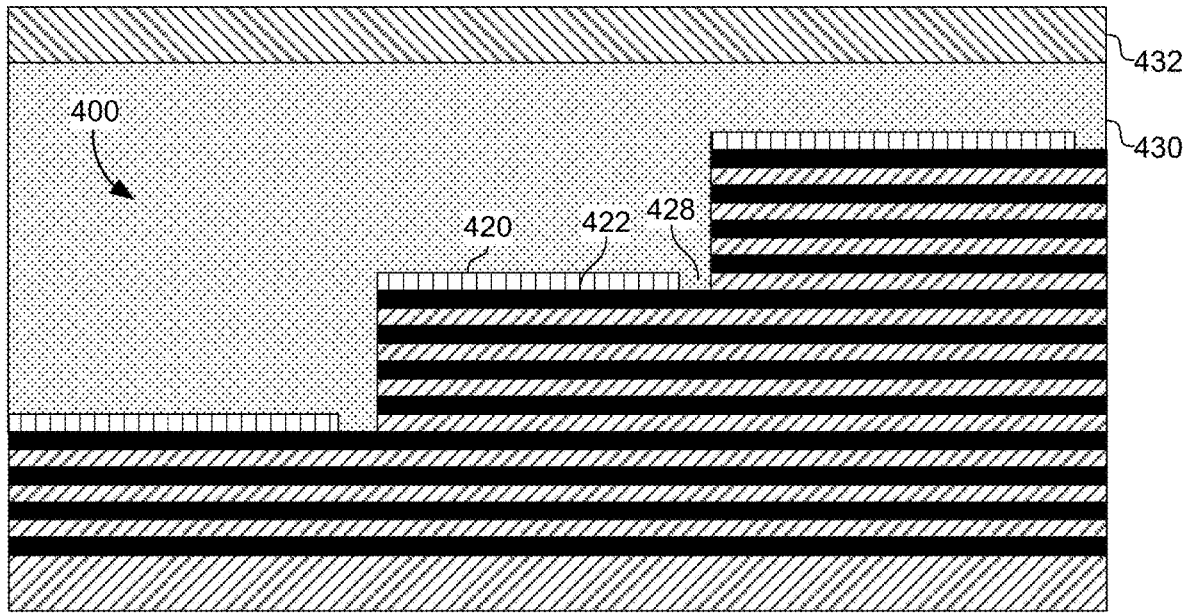
Figure 4D:
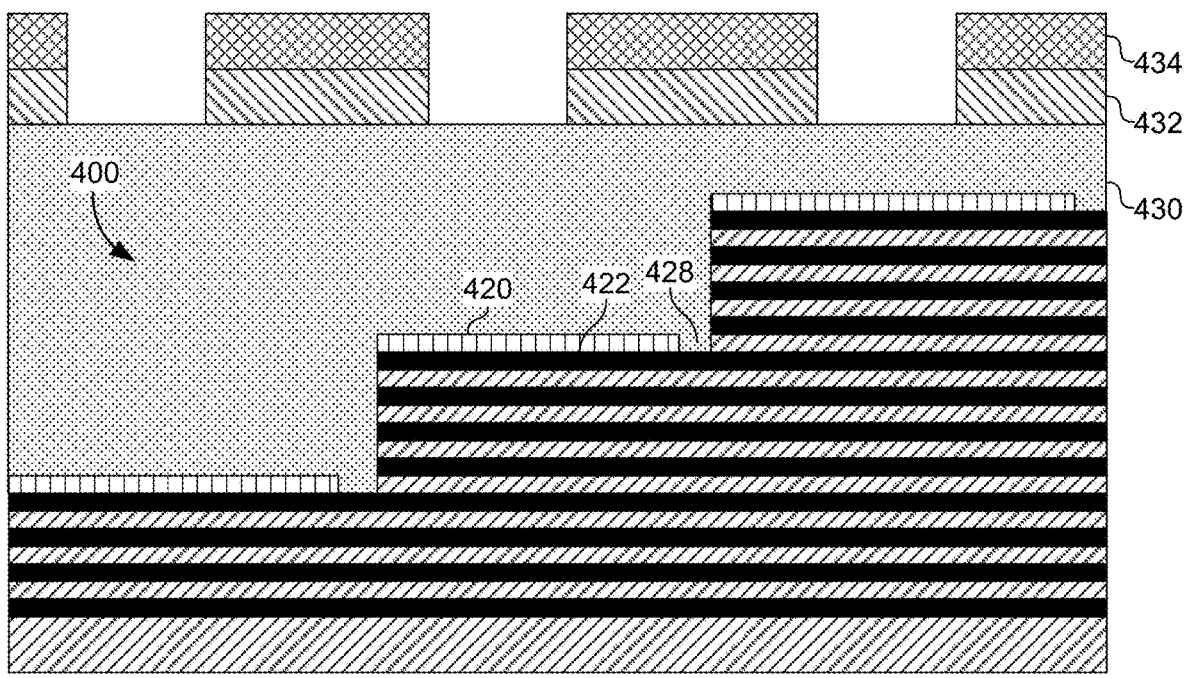

FIG. 4C illustrates the deposition of a hard mask 432 on top of the gap fill material 430, according to some embodiments. FIG. 4D illustrates how the hard mask 432 may be opened with a pattern 434 above each of the landing pads, according to some embodiments. These operations may be performed using conventional techniques. This process may generate holes in the hard mask 432 for a subsequent etch process to form contact holes where the vertical wordlines may be formed.

Figure 4E:
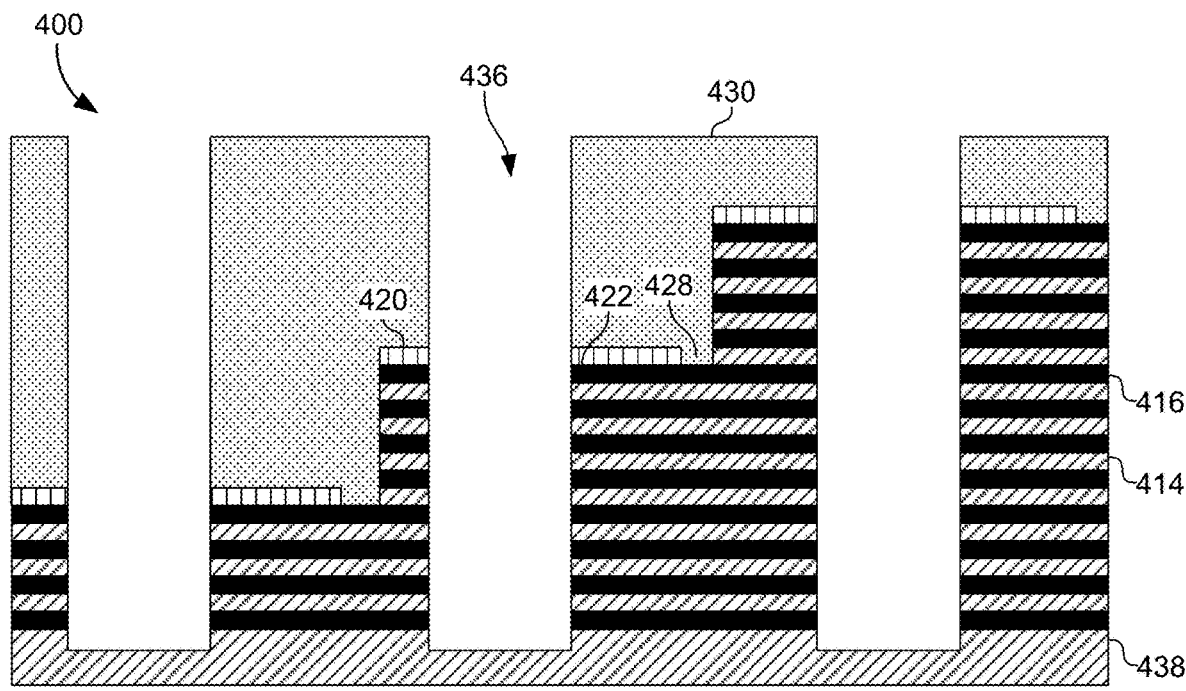

The method 300 may also include etching a hole for a vertical wordline that extends through one or more of the horizontal wordline layers beneath the landing pad (304). FIG. 4E illustrates a contact etch that may be performed to create holes for the vertical wordlines, according to some embodiments. An etch may be performed through the hard mask 432 to etch holes through the gap fill material 430 and the liner 420. This may be contrasted with conventional methods for forming the vertical wordlines. Prior to this disclosure, this etch was performed after the sacrificial layer 416 was removed and the voids were filled with the metal layers. Then, the etch had to be performed such that only the top metal layer was exposed on each landing pad. Thus the etch had to be very selective to the metal layer (e.g. tungsten) to prevent the etch from punching through the top metal layer and shorting the memory elements within the structure 400.

In contrast with conventional methods, some embodiments instead may etch a contact hole 436 that penetrates not only the gap fill material, but the liner 420 as well as a plurality of the sacrificial layers 416 and/or the insulating layers 414 underneath. For example, some embodiments may etch the hole 436 down to a substrate 438. The substrate 438 may include a silicon substrate or an oxide layer that is thicker than the other insulating layers 414. Some embodiments may etch the hole 436 through all of the sacrificial layers 416 and/or the insulating layers 414. Some embodiments may etch the hole 436 such that the hole 436 penetrates more than one of the sacrificial layers 416 but not all of the sacrificial layers 416 beneath the landing pad 422. Some embodiments may etch the hole 436 such that the hole 436 penetrates below a surface level of the substrate 438. Some embodiments may etch each hole 436 to a same depth, will other embodiments may adjust the depth of each hole to penetrate below a top sacrificial layer of each landing pad.

Figure 4F:
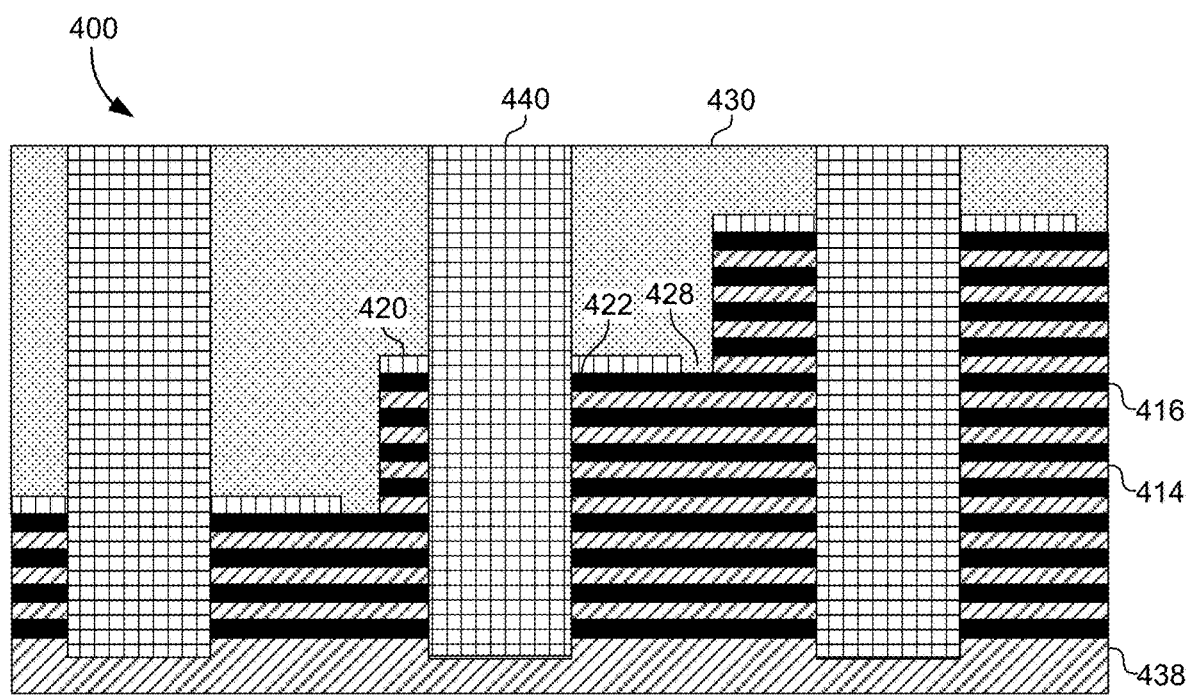

The method may optionally also include filling the hole for the vertical wordline with a fill material and/or exhuming a sacrificial material from the horizontal wordline layers. (306). FIG. 4F illustrates how the contact holes may be temporarily filled, according to some embodiments. A deposition process may be used to fill the hole 436 with a fill material 440, such as silicon. In contrast to previous techniques, the fill material 440 may fill the hole 436 such that the fill material 440 penetrates multiple sacrificial layers 416 and/or insulating layers 414, all of the sacrificial layers 416 and/or insulating layers 414, down to the surface of the substrate 438, or below the surface of the substrate 438.

Figure 4G:
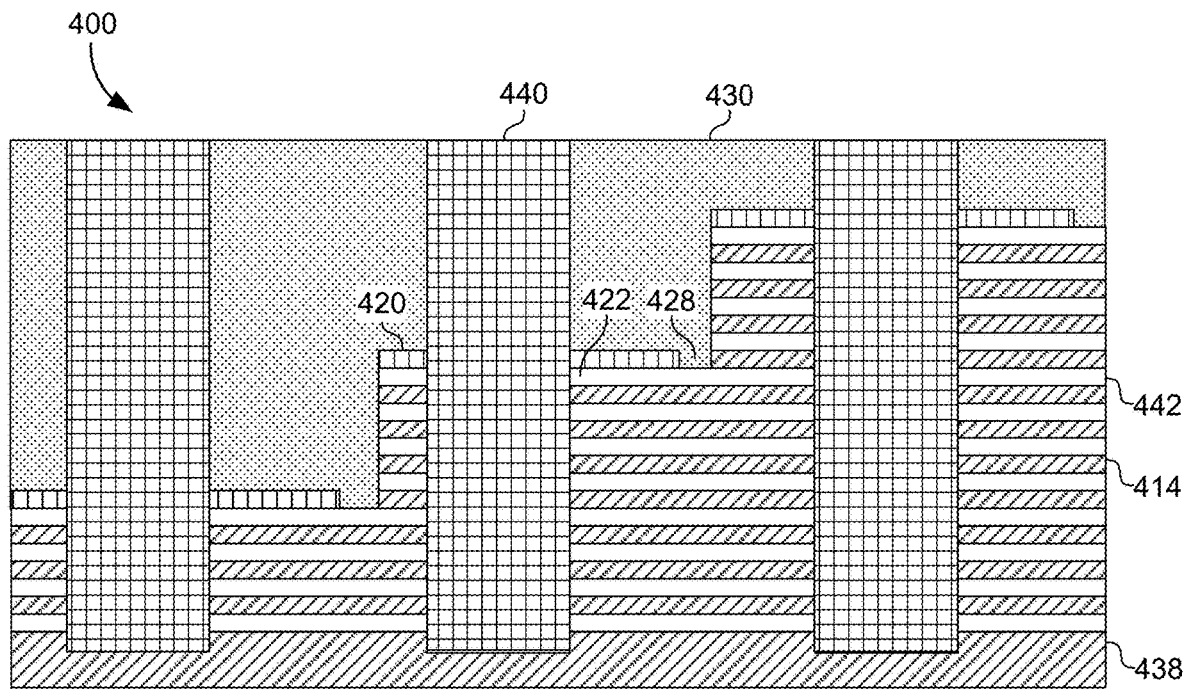

FIG. 4G illustrates an exhume process for the sacrificial layer 416, according to some embodiments. For example, a wet etch process may be used to exhume the silicon nitride material used as the sacrificial layers 416. The voids 442 left behind after removing the sacrificial layers 416 may later be filled by the metal layers to form the horizontal wordlines for the memory elements in the structure 400. Therefore, the sacrificial layer exhume process may leave behind the insulating layers 414, the liner 420, the fill material 440, and the gap fill material 430.

Figure 4H:
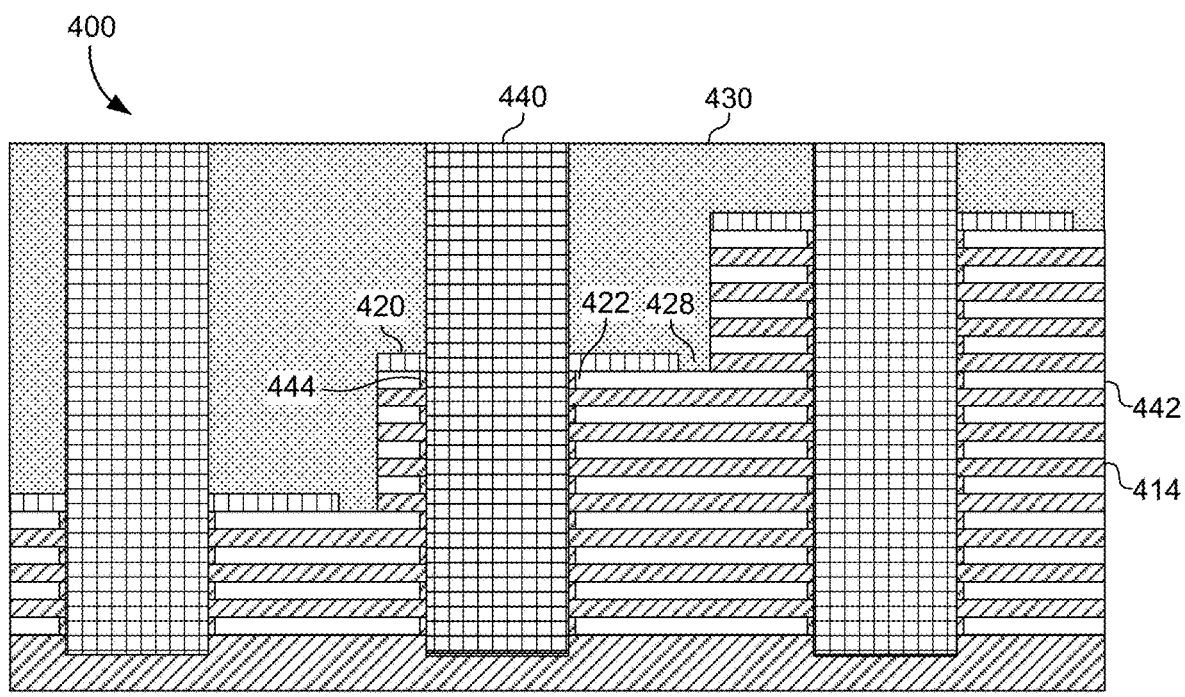

The method may optionally also include forming a barrier layer in the voids left after exhuming the sacrificial material from the horizontal wordlines (308). FIG. 4H illustrates a the formation of barrier layers 444 for the horizontal wordlines, according to some embodiments. The surfaces of the fill material 440 may be exposed inside the voids 442 left behind after removing the sacrificial layers 416, and the barrier layer is formed on a vertical sidewall of the fill material that is exposed in the voids left after exhuming the sacrificial material. The barrier layer 444 may serve to isolate the area inside the voids 442 from the contact holes that are filled with the fill material 440. As will be shown below, the barrier layer 444 may later isolate the conductive horizontal wordlines from the conductive vertical wordlines along the depth of each of the contact holes below the contact pads.

A number of different processes may be used to form the barrier layers. In some embodiments, a silicon oxidation process may be used. During the oxidation process, for example, a silicon oxide layer may form on the exposed silicon of the fill material 440 in these voids 442. Therefore, the oxidation process may form a barrier layer 444 inside each of the voids 442 adjacent to the fill material 440.

Some embodiments may replace the silicon oxidation process described above with an ALD process to form the barrier layer 444 in the voids 442 adjacent to the fill material 440. Instead of oxidizing the silicon of the fill material 440, the ALD process may incrementally deposit an oxide layer to form the barrier layer 444 in each of the voids 442. This is useful since the oxidation process may also influence the Equivalent Oxide Thickness (EOT) of the device defined by the MANOS stack. In addition, the ALD process can be used to deposit a number of other dielectrics which might have more favorable selectivity during the rest of the device integration steps than just oxides of silicon. The ALD process may also be used to accurately control the thickness of the barrier layer 444.

The barrier layer 444 may be relatively thin compared to other dimensions within the 3D man structure. For example, the barrier layer 444 may be less than or about 20 Å, less than or about 40 Å, less than or about 40 Å, less than or about 50 Å, less than or about 60 Å, less than or about 70 Å, less than or about 80 Å, less than or about 90 Å, less than or about 100 Å, less than or about 110 Å, less than or about 120 Å, less than or about 130 Å, less than or about 140 Å, less than or about 150 Å, less than or about 160 Å, less than or about 170 Å, less than or about 180 Å, less than or about 190 Å, less than or about 200 Å, less than or about 225 Å, less than or about 250 Å, less than or about 275 Å, less than or about 300 Å, less than or about 350 Å, less than or about 400 Å, and so forth, depending on the size of the structure 400. For example, the barrier layer 444 may be approximately 100 Å to approximately 150 Å thick, and the barrier layer 444 may extend into the voids 442. In various embodiments, the barrier layer may be between or greater than about 50 Å and about 100 Å, between or greater than about 50 Å and about 150 Å, between or greater than about 50 Å and about 200 Å, between or greater than about 100 Å and about 200 Å, between or greater than about 150 Å and about 200 Å, between or greater than about 150 Å and about 250 Å, and so forth.

Figure 4I:
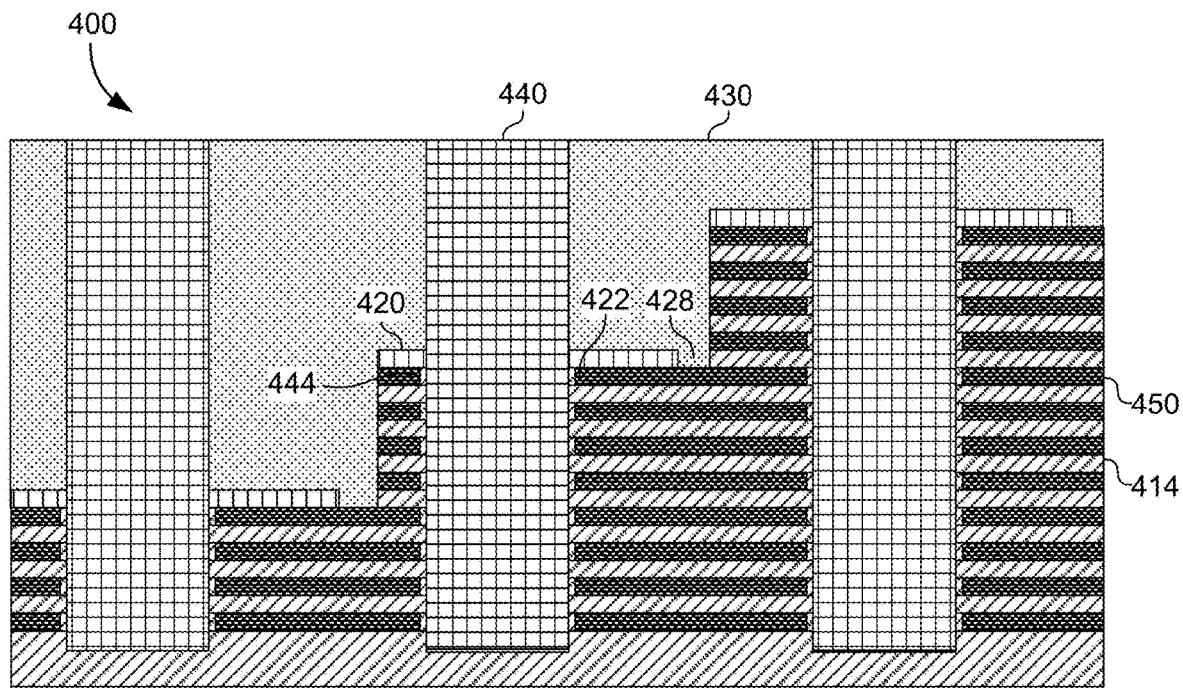

FIG. 4I illustrates a wordline deposition, according to some embodiments. For example, some embodiments may first form an aluminum oxide layer (e.g., a high-k layer) in the voids 442. The aluminum oxide may be deposited using an ALD process to coat any of the exposed surfaces in the voids 442. For example, the aluminum oxide layer may be approximately 2 nm to a about 3 nm thick. Note that the aluminum oxide layers are not shown explicitly in FIG. 4I due to their relatively small size. Then, a deposition process may be used to deposit the horizontal wordline layers 450 in the voids 442. The horizontal wordline layers may be formed using any conductive material or metal, such as tungsten, molybdenum, or other similar conductive materials.

Figure 4J:
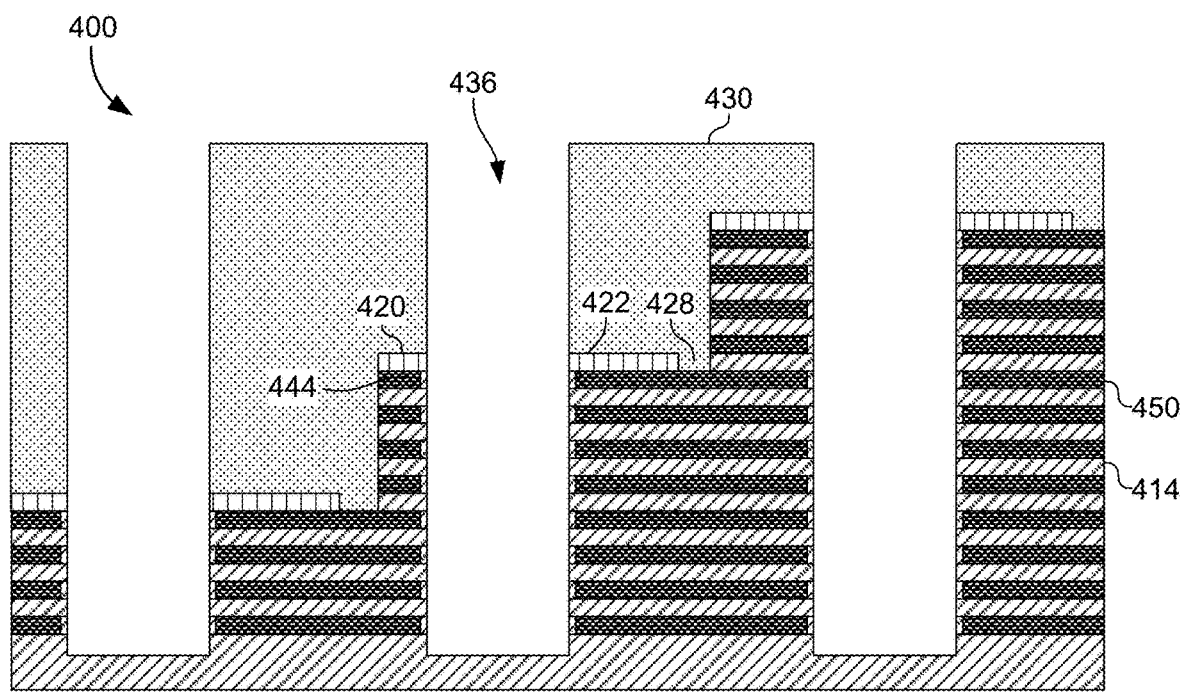

The method 300 may further optionally include removing the fill material and filling the hole with a conductive material (310). FIG. 4J illustrates the removal of the fill material 440, according to some embodiments. The purpose of the fill material 440 is to provide a surface for the barrier layer 444 described above. For example, the fill material 440 may provide a surface on which to grow the silicon oxide for the barrier layer 444 using the oxidation process described above. Alternatively, the fill material 440 may provide a surface on which to form an oxide using the ALD process described above. Therefore after the barrier layer 444 is formed and the horizontal wordline layers 450 have been formed, the fill material 440 may be removed. As illustrated, this may again expose the contact hole 436.

Figure 4K:
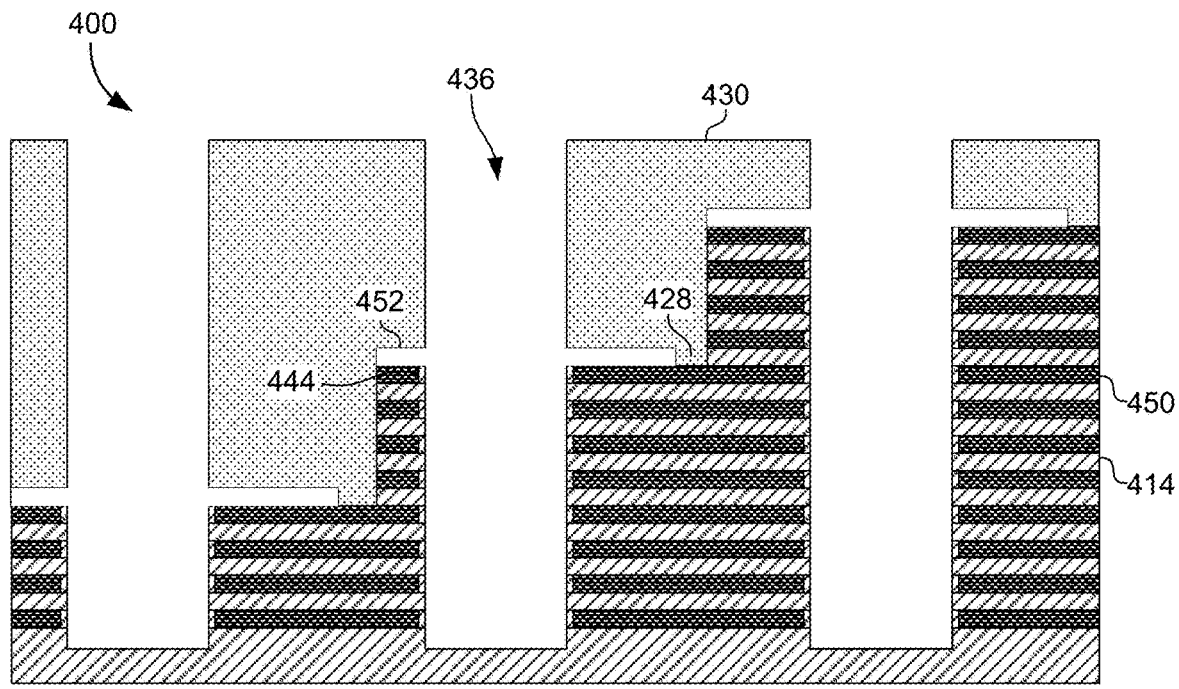

FIG. 4K illustrates the removal of the liner 420, according to some embodiments. For example, an etch process may be used to remove the doped silicon oxide material that may be used for the liner 420. In some embodiments, the aluminum oxide layer formed between the horizontal wordline layers 450 and the liner 420 may also be removed. By removing the aluminum oxide layer, a void 452 may be exposed between the top horizontal wordline layer and the contact hole 436. For example, a two-step etch may be used to first remove the doped silicon oxide of the liner 420, then a second step may remove the aluminum oxide layer.

Figure 4L:
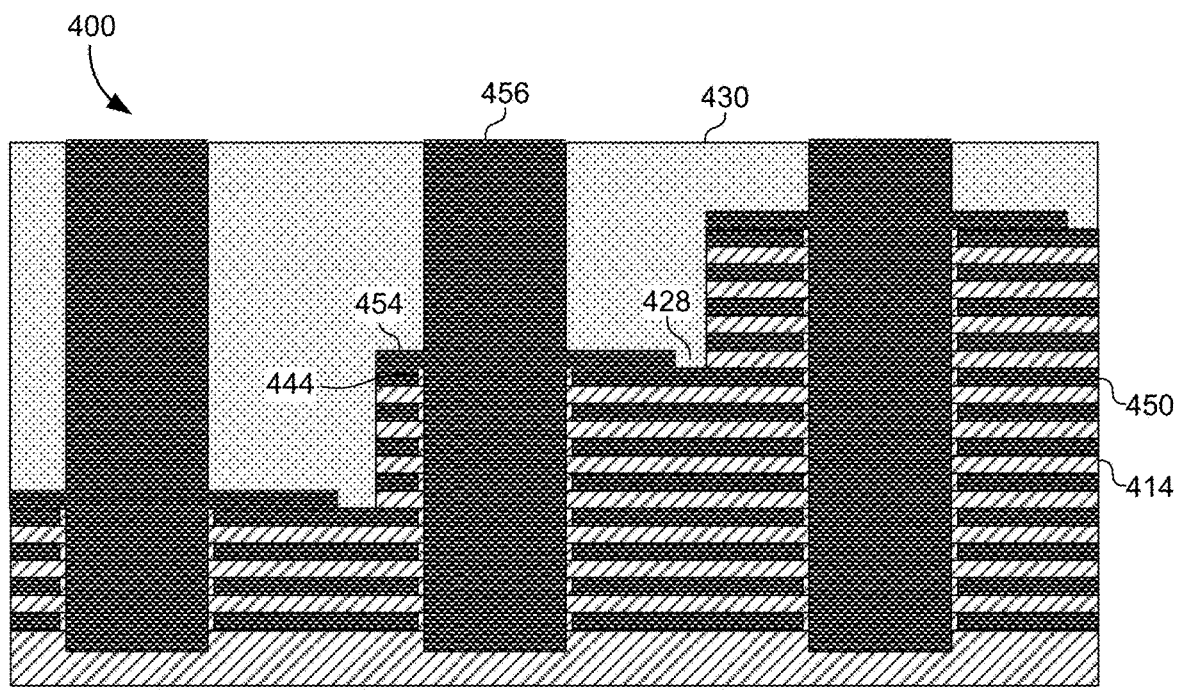

FIG. 4L illustrates the formation of the vertical wordlines, according to some embodiments. For example, some embodiments may first deposit a titanium nitride liner, then may fill the contact hole 436 with a metal or other conductive material to form the vertical wordline 456. This process may also fill the void 452 with the metal or other conductive material to form a conductive liner 454 to replace the liner 420. The conductive liner 454 may include tungsten, molybdenum, titanium, or other similar materials.

In some embodiments, the conductive liner 454 may be formed at the same time as the vertical wordline 456. Thus, the same material may be used to form both the conductive liner 454 and the vertical wordline 456. This material may be the same or different from the conductive material used to form the horizontal wordline layers 450. More generally, the horizontal wordline layers 450 may be formed from a first conductive material, and the conductive liner 454 may be formed from a second conductive material. The first conductive material may be the same as the second conductive material, or the first material may be different from the second conductive material.

Note that the conductive material of the vertical wordline 456 may only make electrical contact with the conductive liner 454 that replaced the liner 420 to contact the top horizontal wordline layer. Therefore, the vertical word line 456, the conductive liner 454, and the top horizontal word line layer may be referred to as being conductively connected to each other. For example, this conductive connection may include less than 5 ohms of resistance. In other embodiments, this conductive connection may include less than about 10 ohms, less than about ohms, less than about 50 ohms, or less than about 100 ohms, depending on the embodiment. This conductive connection may also include a direct contact between these layers and layers without any significant intervening layers of insulating materials.

Figure 5:
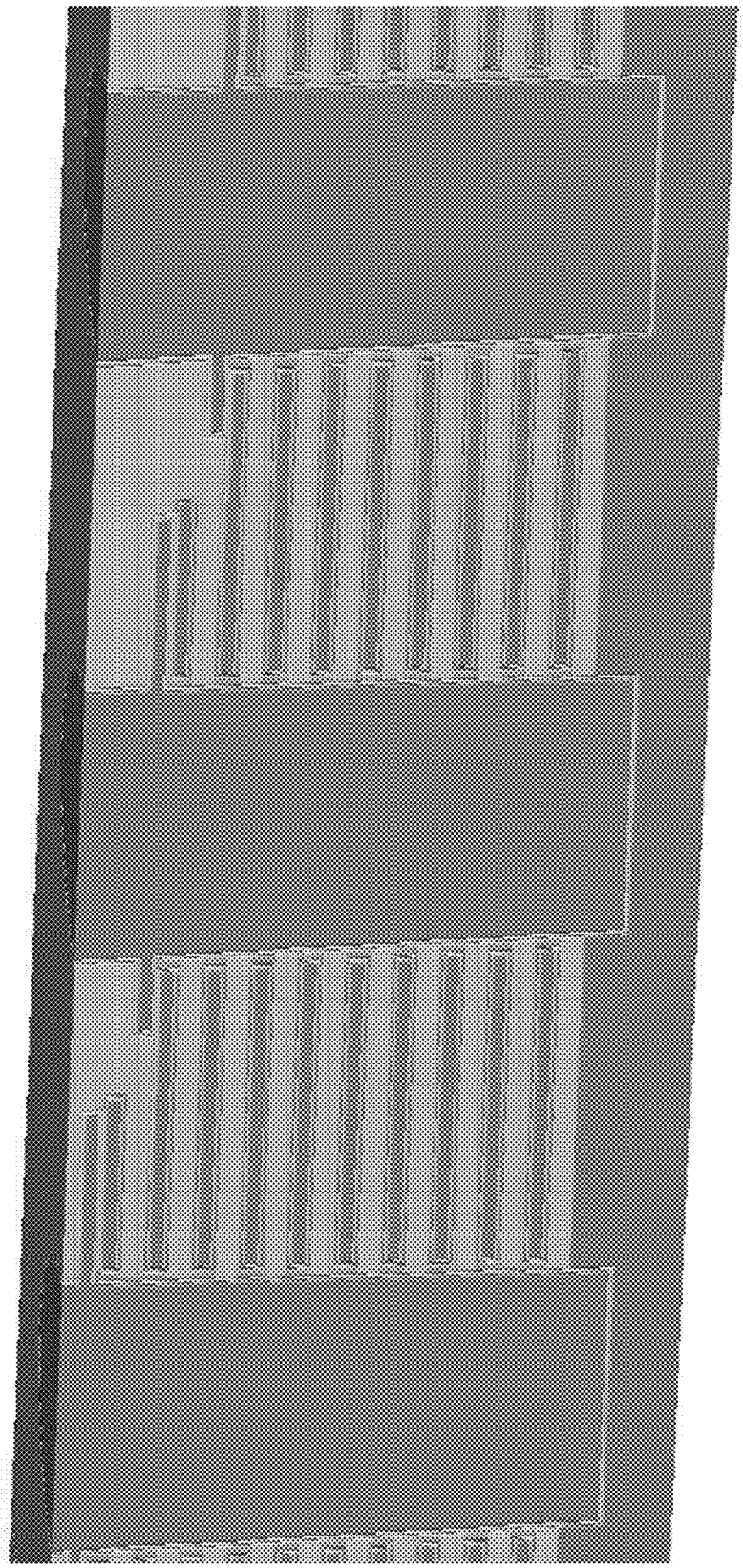
FIG. 5 illustrates a 3D NAND structures, according to some embodiments.

Like conventional 3D NAND structures, the vertical wordline 456 only makes conductive contact with the top metal layer as a horizontal wordline while being insulated from other horizontal word lines. However, here that connection goes through the conductive liner 454 replacing the liner 420. The gap 428 prevents the conductive liner 454 from contacting any of the horizontal wordline layers 450 above the intended horizontal wordline. Additionally, since the metal of the vertical wordline 456 extends down through the structure 400, the barrier layers 444 formed on the fill material prevent the vertical wordline 456 from contacting any of the underlying metal layers. FIG. 5 illustrates a view of the 3D NAND structure after this process is complete.

As used herein, the terms "about" or "approximately" or "substantially" may be interpreted as being within a range that would be expected by one having ordinary skill in the art in light of the specification.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A three-dimensional (3D) NAND memory structure comprising:
   a plurality of material layers arranged in a vertical stack comprising alternating horizontal insulating layers and horizontal wordline layers, wherein the plurality of material layers are etched to form a landing pad; and
   a vertical wordline that extends through one or more of the horizontal wordline layers beneath the landing pad, wherein:
   the vertical wordline is conductively connected to a top horizontal wordline in the plurality of alternating material layers, and the vertical wordline is insulated from the one or more horizontal wordlines that the vertical wordline extends through beneath the top horizontal wordline.

2. The 3D NAND memory structure of claim 1, further comprising oxide barrier layers that insulate the one or more horizontal wordlines from the vertical wordline.

3. The 3D NAND memory structure of claim 2, wherein the barrier layer is disposed between the vertical wordline and the top horizontal wordline at the landing pad.

4. The 3D NAND memory structure of claim 1, further comprising a conductive liner over the top horizontal wordline at the landing pad that conductively contacts the top horizontal wordline and the vertical wordline.

5. The 3D NAND memory structure of claim 1, wherein the vertical wordline extends down to a substrate beneath the plurality of material layers.

6. The 3D NAND memory structure of claim 1, wherein the vertical wordline extends down into a substrate beneath the plurality of material layers.

7. The 3D NAND memory structure of claim 1, wherein the vertical wordline contacts the horizontal insulating layers.

8. A method of fabricating three-dimensional (3D) NAND memory structures, the method comprising:
   forming a plurality of material layers arranged in a vertical stack comprising alternating horizontal insulating layers and horizontal wordline layers, wherein the plurality of material layers are etched to form a landing pad;
   etching a hole for a vertical wordline that extends through one or more of the horizontal wordline layers beneath the landing pad
   filling the hole for the vertical wordline with a fill material; and
   exhuming a sacrificial material from the horizontal wordline layers.

9. The method of claim 8, further comprising forming a barrier layer in voids left after exhuming the sacrificial material from the horizontal wordlines, wherein the barrier layer is formed on a vertical sidewall of the fill material that is exposed in the voids left after exhuming the sacrificial material.

10. The method of claim 9, wherein forming the barrier layer comprises forming an oxide layer on the vertical sidewall of the fill material using an ALD process.

11. The method of claim 9, wherein the barrier layer is between 100 Å and 150 Å thick.

12. The method of claim 9, further comprising:
    filling the voids left after exhuming the sacrificial material from the horizontal wordlines with a first conductive material;
    removing the fill material from the hole for the vertical wordline; and
    filling the hole for the vertical wordline with a second conductive material, wherein the barrier layer insulates the second conductive material from the first conductive material for the one or more horizontal wordlines beneath the landing pad.

13. A three-dimensional (3D) NAND memory structure comprising:
    a plurality of material layers arranged in a vertical stack comprising alternating horizontal insulating layers and horizontal wordline layers, wherein the plurality of material layers are etched to form a landing pad; and
    a liner formed over a top horizontal wordline at the landing pad, wherein the liner defines a gap between the liner and a vertical sidewall adjacent to the landing pad.

14. The 3D NAND memory structure of claim 13, wherein the liner comprises an insulating liner formed of a material that is different from a sacrificial material that forms the horizontal wordline layers.

15. The 3D NAND memory structure of claim 13, wherein the liner comprises a conductive liner comprising a first conductive material that is in conductive contact with a second conductive material that forms the top horizontal wordline at the landing pad.

16. The 3D NAND memory structure of claim 13, further comprising a barrier layer between the horizontal wordline layers and a vertical wordline that insulates the horizontal wordline layers from the vertical wordline.

17. The 3D NAND memory structure of claim 13, wherein the liner exposes a vertical sidewall of the plurality of material layers adjacent to the landing pad.

18. The 3D NAND memory structure of claim 13, wherein the gap is between about 50 nm and about 100 nm wide.

19. The 3D NAND memory structure of claim 13, wherein the gap exposes a portion of the top horizontal wordline at the landing pad.

* * * * *